(12) United States Patent
Zhang et al.

(10) Patent No.: US 11,210,228 B2
(45) Date of Patent: Dec. 28, 2021

(54) METHOD, DEVICE AND COMPUTER PROGRAM PRODUCT FOR CACHE MANAGEMENT

(71) Applicant: EMC IP Holding Company LLC, Hopkinton, MA (US)

(72) Inventors: Ming Zhang, Beijing (CN); Shuo Lv, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/585,607

(22) Filed: Sep. 27, 2019

(65) Prior Publication Data
US 2020/0133870 A1    Apr. 30, 2020

(30) Foreign Application Priority Data
Oct. 31, 2018  (CN) .......................... 201811291308.0

(51) Int. Cl.
| | | |
|---|---|---|
| G06F 12/0882 | (2016.01) | |
| G06F 12/0871 | (2016.01) | |
| G06F 12/0864 | (2016.01) | |
| G06F 12/123 | (2016.01) | |
| G06F 12/02 | (2006.01) | |
| G06F 3/06 | (2006.01) | |
| G06F 12/0804 | (2016.01) | |

(52) U.S. Cl.
CPC ...... *G06F 12/0882* (2013.01); *G06F 12/0246* (2013.01); *G06F 12/0864* (2013.01); *G06F 12/0871* (2013.01); *G06F 12/123* (2013.01); *G06F 3/0611* (2013.01); *G06F 3/0638* (2013.01); *G06F 12/0804* (2013.01)

(58) Field of Classification Search
CPC ............. G06F 12/0882; G06F 12/0871; G06F 12/0864; G06F 12/123; G06F 12/0246; G06F 12/0804; G06F 3/0611; G06F 3/0638; G06F 3/0683
See application file for complete search history.

(56) References Cited

U.S. PATENT DOCUMENTS

| | | | |
|---|---|---|---|
| 8,327,076 B2 | 12/2012 | Murphy et al. | |
| 8,516,219 B2 | 8/2013 | Post et al. | |
| 8,688,894 B2 | 4/2014 | Kuehne | |
| 9,003,099 B2 | 4/2015 | Kurita | |
| 9,213,633 B2 | 12/2015 | Canepa et al. | |
| 2014/0115241 A1* | 4/2014 | Wei ..................... | G06F 12/0246 711/103 |
| 2016/0259728 A1* | 9/2016 | Eddy ................... | G06F 12/0833 |
| 2018/0150402 A1* | 5/2018 | Ash ..................... | G06F 12/0893 |
| 2018/0173637 A1* | 6/2018 | Shifer ................. | G06F 12/0804 |
| 2019/0179770 A1* | 6/2019 | Walker ................ | G06F 12/126 |

* cited by examiner

*Primary Examiner* — Masud K Khan
*Assistant Examiner* — Trung-Hao Joseph Nguyen
(74) *Attorney, Agent, or Firm* — BainwoodHuang

(57) ABSTRACT

Techniques perform cache management. Such techniques involve: obtaining a first cache page of the cache to be flushed, the first cache page being associated with a target storage block in a storage device; determining from the cache a set of target cache pages to be flushed, each of the set of target cache pages being associated with the target storage block; and writing data in the first cache page and data in each of the set of target cache pages into the target storage block simultaneously.

21 Claims, 5 Drawing Sheets

METHOD, DEVICE AND COMPUTER PROGRAM PRODUCT FOR CACHE MANAGEMENT

CROSS-REFERENCE TO RELATED APPLICATION

This application claims priority to Chinese Patent Application No. CN201811291308.0, on file at the China National Intellectual Property Administration (CNIPA), having a filing date of Oct. 31, 2018, and having "METHOD, DEVICE AND COMPUTER PROGRAM PRODUCT FOR CACHE MANAGEMENT" as a title, the contents and teachings of which are herein incorporated by reference in their entirety.

FIELD

The present disclosure generally relates to the field of storage technologies, and more specifically, to a method, a device and a computer program product for managing cache.

BACKGROUND

With the rapid development of data storage technologies, various data storage devices are now capable of providing an increasingly higher data storage capacity for users, and the data access speed has been improved to a great extent. As the data storage capacity is improved, users put forward higher demands on data reliability and response time of a storage system.

Nowadays, there has been developed a technical solution of creating a storage system based on a multi-level storage medium with different access speeds. For example, frequently used data can be loaded from a storage device with a lower access speed to a cache device with a higher access speed, and the cache device thus responds to an access request from outside of the storage system. The technical solution can improve the efficiency time to an access request to a certain extent. Therefore, how to efficiently manage a cache device to improve the efficiency becomes a hot issue.

SUMMARY

Embodiments of the present disclosure provide a solution for cache management.

In accordance with a first aspect of the present disclosure, there is provided a method of managing cache. The method includes: obtaining a first cache page of the cache to be flushed, the first cache page being associated with a target storage block in a storage device; determining from the cache a set of target cache pages to be flushed, each of the set of target cache pages being associated with the target storage block; and writing data in the first cache page and data in each of the set of target cache pages into the target storage block simultaneously.

In accordance with a second aspect of the present disclosure, there is provided a device for managing cache. The device includes: at least one processing unit; and at least one memory coupled to the at least one processing unit and storing instructions for execution by the at least one processing unit, the instructions, when executed by the at least one processing unit, causing the device to perform acts including: obtaining a first cache page of the cache to be flushed, the first cache page being associated with a target storage block in a storage device; determining from the cache a set of target cache pages to be flushed, each of the set of target cache pages being associated with the target storage block; and writing data in the first cache page and data in each of the set of target cache pages into the target storage block simultaneously.

In accordance with a third aspect of the present disclosure, there is provided a computer program product. The computer program product is stored on a non-transient computer storage medium and includes a machine executable instruction, and the machine executable instruction, when operating in a device, causes the device to execute the method of the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the present disclosure.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in example embodiments of the present disclosure.

DETAILED DESCRIPTION OF EMBODIMENTS

Figure 1:
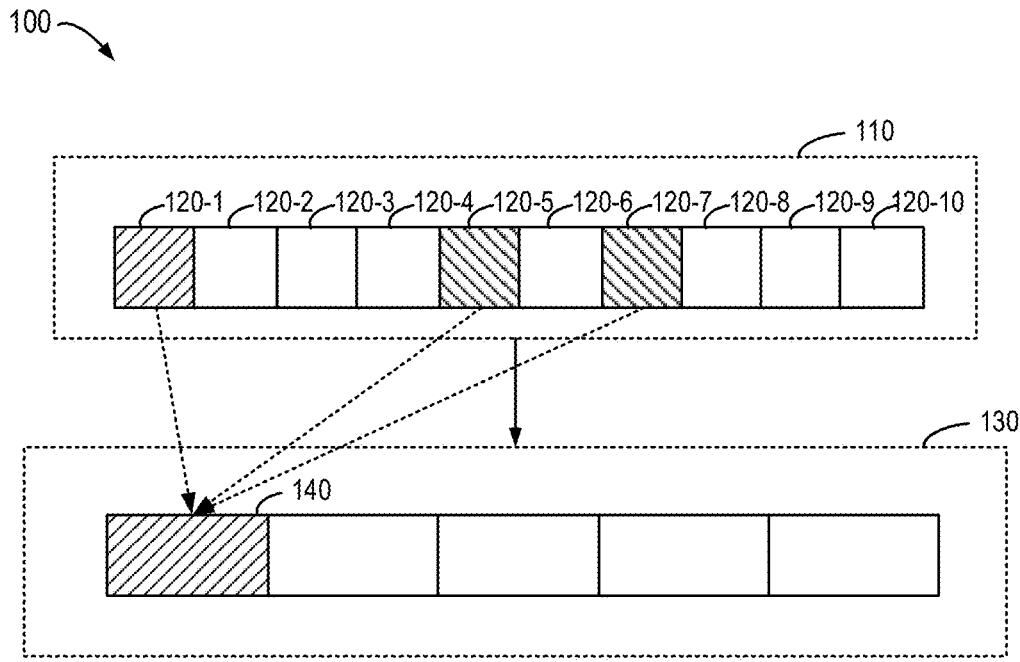
FIG. 1 illustrates an architecture diagram of a storage system in which embodiments of the present disclosure can be performed therein.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others can denote different or identical objects. The following text may also contain other explicit or implicit definitions.

As described above, there has been developed a technical solution of creating a storage system based on a multi-level storage medium with different access speeds. FIG. 1 illustrates a storage system 100 in which the embodiments of the present disclosure can be performed. As shown in FIG. 1, the storage system 100 can include a cache 110 that includes a plurality of cache pages 120-1 to 120-10 (which are collectively or individually referred to as cache page 120), and a storage device 130 that can include a plurality of storage blocks 140.

In some cases, a minimum unit in the cache 110 may be different from a minimum unit in the storage device 130 in size. For example, in an example, the processable minimum unit in the cache 110 is a single cache page 120 (for example, 8 KB), while the processable minimum unit in the storage unit 140 is a single storage block 140 (for example, 64 KB). In this case, in a procedure of flushing data in the cache 110 to the storage device 130, degradation in performance caused by size inconsistency of the minimum units may occur. For example, when it is required to write data in an 8 KB cache page 120-1 into a 64 KB storage block 140, although only 8 KB data are required to be modified, it is still necessary to lock the entire 64 KB storage block 140, thereby impacting the flush performance. To the contrary, for example, both the cache pages 120-5 and 120-7 are associated with the storage block 140 and are directed to different 8 KB addresses. Therefore, there is a possibility of flushing simultaneously the cache pages 120-1, 120-5 and 120-7.

According to embodiments of the present disclosure, there is provided a solution for cache. In the solution, a first cache page of the cache to be flushed is obtained, wherein the first cache page is associated with a target storage block in the storage device. Subsequently, a set of target cache pages to be flushed can be determined from the cache, each of which is associated with the target storage block. Since the target cache pages are all associated with the same target storage block, data in the first cache page and the data in each cache page of the set of the target cache pages are then written simultaneously into the target storage block. In the way, the solution can make full use of the parallelism of flushing different cache pages, thereby improving the efficiency of the cache.

Figure 2:
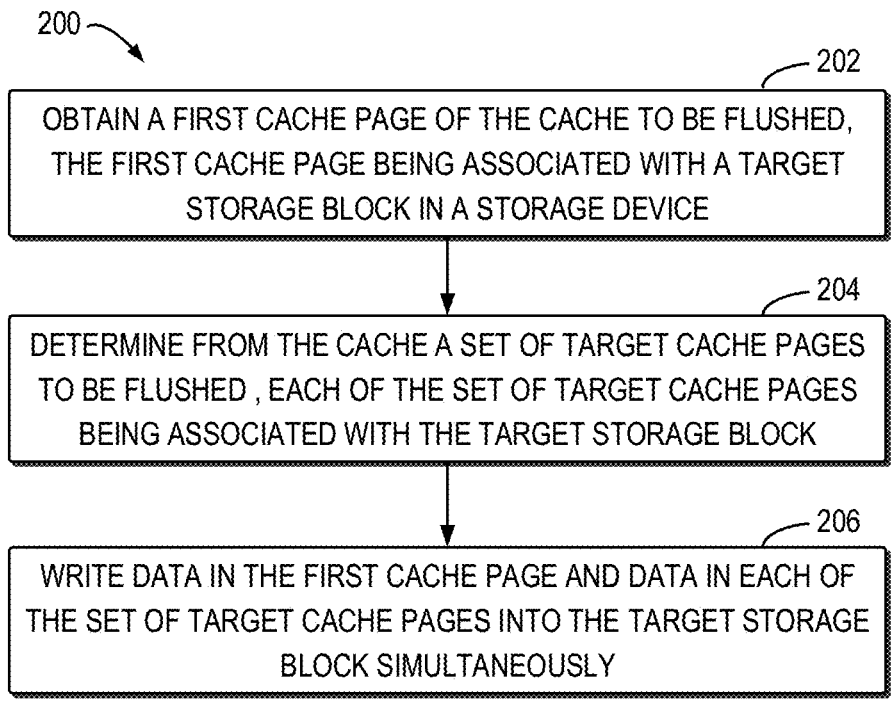
FIG. 2 illustrates a flowchart of a method of managing cache according to embodiments of the present disclosure.

FIG. 2 illustrates a flowchart of a method 200 of managing cache according to embodiments of the present disclosure. The method 200 can be implemented by the cache 110 in the storage system 100. Acts involved in the method 200 will be described with reference to the storage system 100 as shown in FIG. 1.

At block 202, the cache 110 obtains a cache page of the cache to be flushed (which is referred to as a first cache page, for ease of description), wherein the first cache page is associated with a target storage block in the storage device 130. Taking FIG. 1 as an example, the cache 110 can obtain the cache page 120-1 to be flushed which is associated with the target storage block 140.

Figure 3:
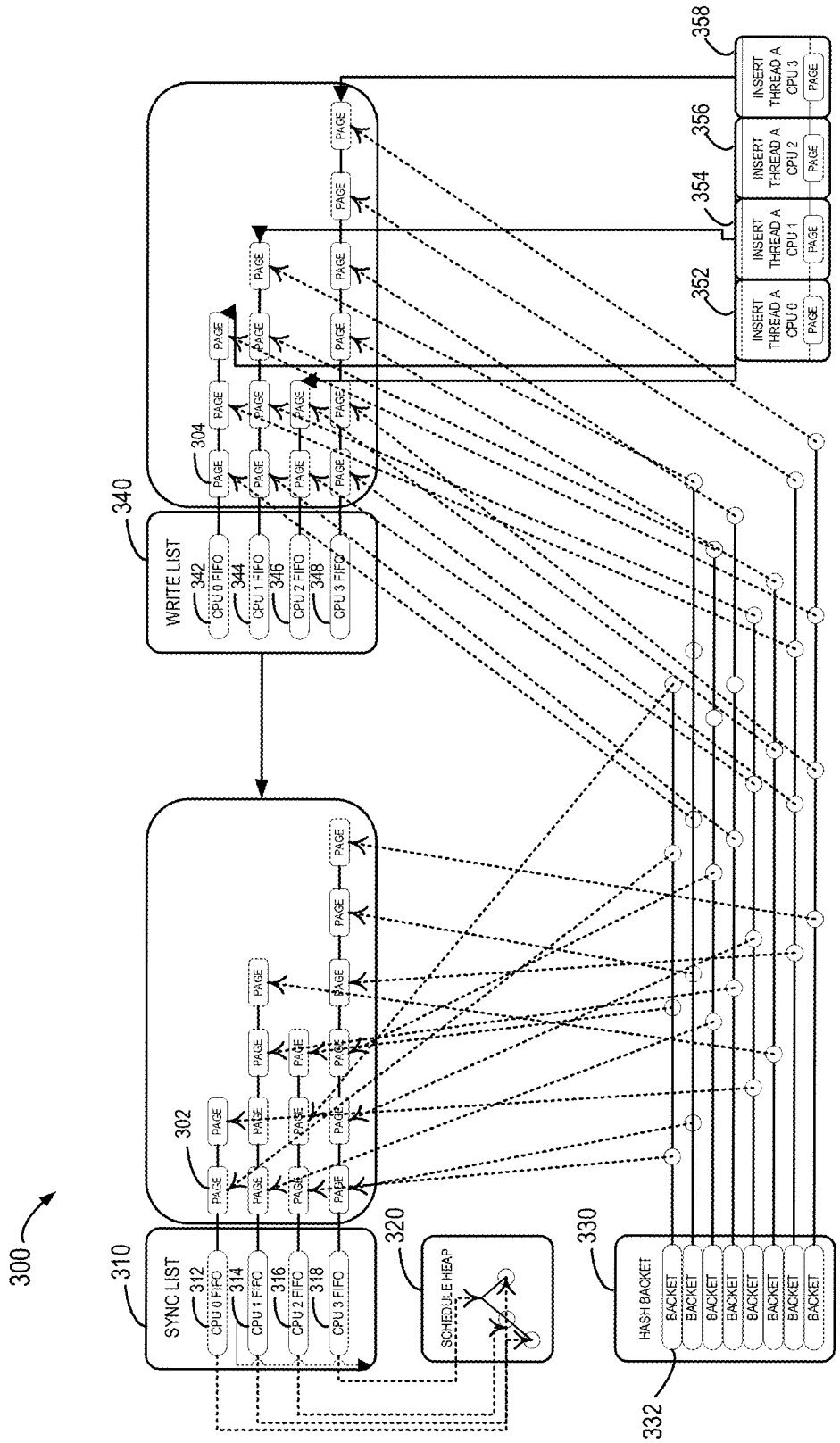
FIG. 3 illustrates a schematic diagram of multicore cache management architecture according to embodiments of the present disclosure.

In some embodiments, the method 200 can further cover a multicore scenario. For example, FIG. 3 illustrates multicore cache management architecture 300 according to embodiments of the present disclosure. As shown in FIG. 3, the architecture 300 is provided therein a sync list 310 and a write list 340, wherein the sync list 310 can include First Input First Output (FIFO) queues 312, 314, 316 and 318 associated with different processor cores. Each FIFO queue can include a plurality of pages 302 queued chronically, each of which includes a cache page address associated with each request which is written into the cache 110, to indicate the corresponding cache page. Therefore, "page" and "cache page" herein can be used interchangeably, and the FIFO queue can be interpreted as a set comprised (or formed) of cache pages.

In addition, the architecture 300 is further provided with a write queue 340, and the write queue 340 can include First Input First Output (FIFO) queues 342, 344, 346 and 348 associated with respective processors. Each FIFO queue can include a plurality of pages 304 queued chronically associated with the processor core. Data written newly into insertion threads 352, 354, 356 and 358 of different processor cores are added to respective tails of the FIFO queues associated with respective processor cores. In some embodiments, the cache 110 can add periodically the respective pages in the write list 340 into the respective queues in the sync list 310. In some embodiments, in a case that the available pages in the cache 110 are not sufficient, the cache 110 can also write proactively respective pages in the write list 340 to the respective queues in the sync list 310, thereby releasing proactively the used cache pages.

In the multicore scenario as shown in FIG. 3, the cache 110 can determine a page with the earliest timestamp (for example, the page 302) from a plurality of pages in the plurality of FIFO queues 312, 314, 316 and 318, and determine the cache page indicated by the cache page address in the page 302, thereby ensuring that the earliest cache page required to be flushed is prioritized in the multicore FIFO queue. In some embodiments, the architecture 300 can include a scheduling heap 320, which is a heap structure constructed of the respective earliest pages in the plurality of FIFO queues 312, 314, 316 and 318 in an order of time, and the cache 110 can, based on the scheduling heap 320, obtain a starting heap page (for example, the page 302) in the scheduling heap 320, and determine the cache page indicated by the cache page address in the page 302. In the way, the cache 110 can determine more quickly the earliest cache page to be flushed in the plurality of FIFO queues.

Continuing to refer to FIG. 2, at block 204, the cache 110 determines from the cache 110 a set of target cache pages to be flushed, wherein each cache page of the set of target cache pages is associated with the target storage block. In some embodiments, each cache page 120 records information of the associated target storage block, and the cache 110 can traverse the cache page 120 to determine the set of target cache pages which are associated with the target storage block 140. In the general scenario as shown in FIG. 1, the cache 110 can determine a set of cache pages to be flushed (the cache page 120-5 and the cache page 120-7) from the plurality of cache pages.

Figure 4:
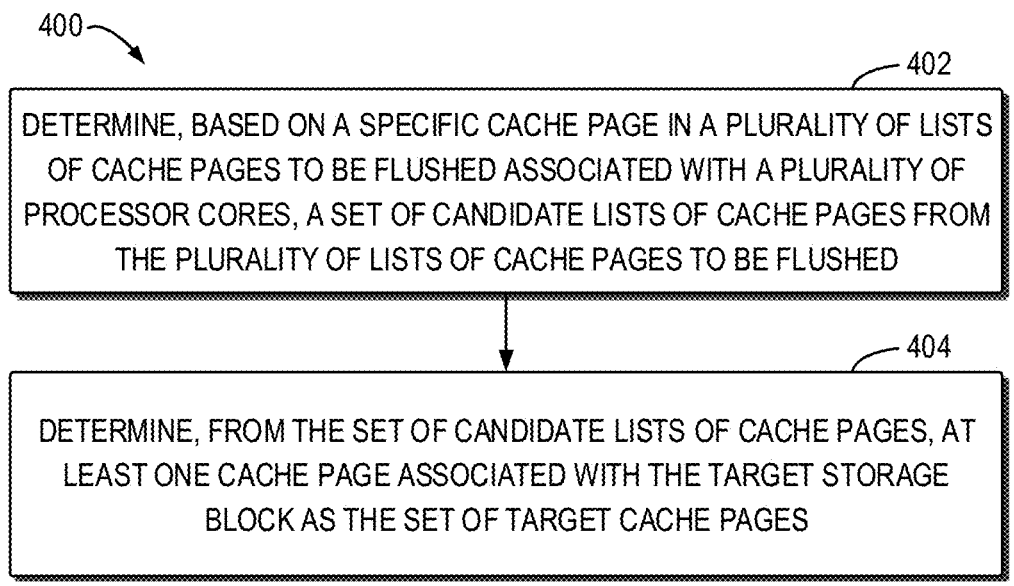
FIG. 4 illustrates a flowchart of a method of determining a set of target cache pages according to embodiments of the present disclosure.

The process of determining a set of target cache pages in a multicore scenario will be described below with reference to FIGS. 4-6. FIG. 4 illustrates a flowchart of a method 400 of determining a set of target cache pages according to embodiments of the present disclosure.

At block 402, based on a specific cache page in a plurality of lists of cache pages to be flushed associated with a plurality of processor cores, the cache 110 determines a set of candidate lists of cache pages from the plurality of lists of cache pages to be flushed. In some embodiments, the specific cache page may be the first cache page, the last cache page, or a cache page selected randomly from the list of cache pages to be flushed. The cache 110 can determine, based on whether the specific cache page is associated with the target storage block, and thereby determine whether the list is to be added to the set of candidate lists of cache pages, so as to reduce a calculation amount of looking for target cache pages. In some embodiments, the cache 110 can further consider the requirement that the earlier cache pages should be preferentially written, and at this time, the specific page can be the earliest cache page in a list of cache pages to be flushed.

In some embodiments, as shown in FIG. 3, a plurality of cache pages to be flushed associated with different processor cores can be constructed as a plurality of FIFO queues 312, 314, 316 and 318 which are associated with different processor cores. FIG. 5 illustrates a diagram 500 of determining a set of candidate cache pages according to embodiments of the present disclosure, and FIG. 6 illustrates a flowchart of a method 600 of determining a set of candidate cache page lists according to embodiments of the present disclosure.

Figure 5:
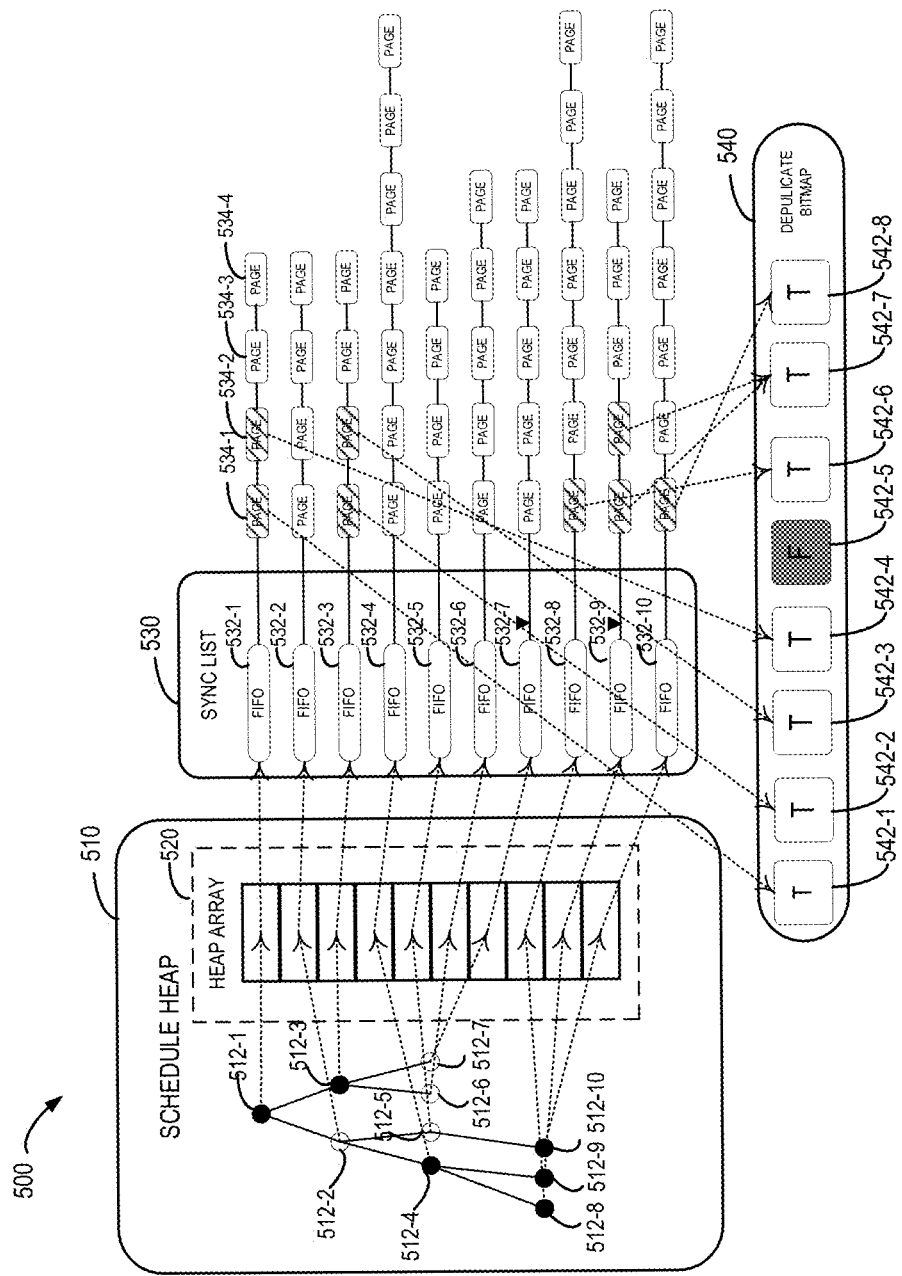
FIG. 5 illustrates a schematic diagram of determining a set of candidate cache pages according to embodiments of the present disclosure.
Figure 6:
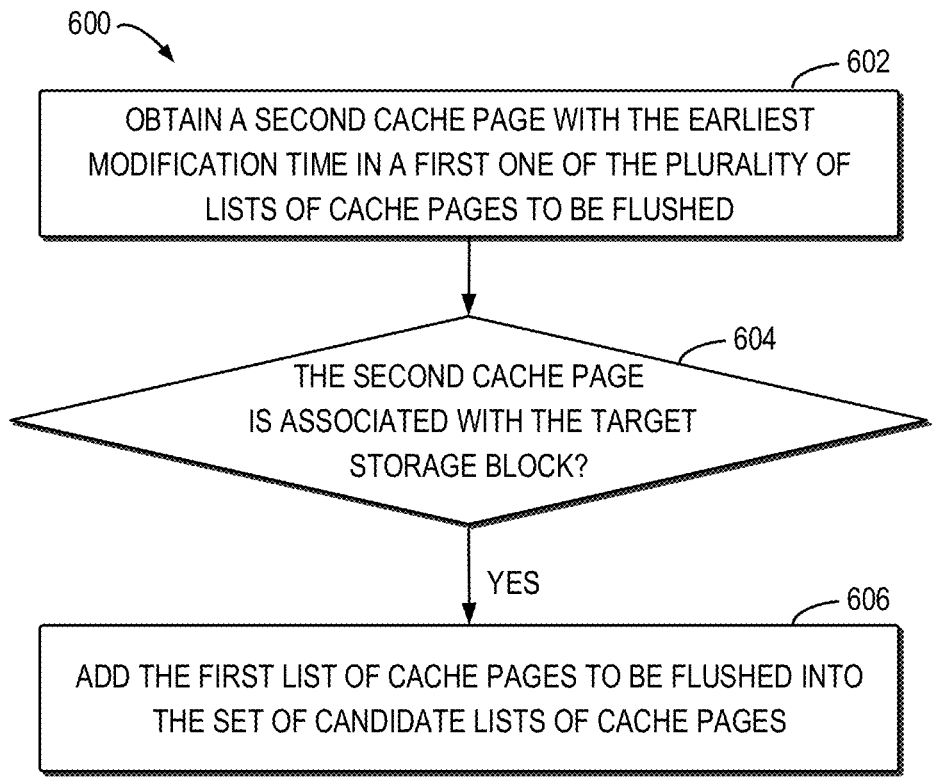
FIG. 6 illustrates a flowchart of a method of determining a set of candidate cache page lists according to embodiments of the present disclosure.

In some embodiments, as shown in FIG. 5, the scheduling heap 510 can include a plurality of nodes 512-1 to 512-10 (which are referred to as node 512 collectively or individually), and each node 512 can be associated with a different processor core. The plurality of nodes are repetitively corresponding to the FIFO queues 532-1 to 532-10 (which are referred to as FIFO queue 532 collectively or individually). The plurality of nodes 512 can be queued according to timestamps of pages at heads of respective FIFO queues 532, and stored in a heap array 520 as required according to the sequence in the heap. As shown in FIG. 5, for example, the node 512-1 can be associated with the FIFO queue 532-1, and the page 534-1 has the earliest timestamp and the corresponding cache page therefore is the cache page to be flushed. A method 600 of determining a set of candidate cache page lists will be described with reference to FIG. 6.

At block 602, the cache 100 obtains the cache page with the earliest modification time (which is referred to as second cache page below, for convenience) in a first one of the plurality of lists to be flushed. In some embodiments, as shown in FIG. 5, the lists of cache pages to be flushed are organized into a plurality of FIFO queues 530, and the cache page with the earliest modification time in each FIFO queue 530 is the page at the head of the FIFO queue 530. In some embodiments, the list of cache to be flushed can be organized in other data structures with timestamps, and the cache 110 can determine the cache page with the earliest timestamp from each list of cache pages to be flushed.

At block 604, the cache 110 determines whether the second cache page is associated with the target storage block. In some embodiments, the cache 110 can determine whether the second cache page is associated with the target storage block based on the address of the storage block corresponding to the second cache page. In some embodiments, the cache 110 can determine, sequentially in an order of the scheduling heap 510, whether respective nodes 512 in the scheduling heap 510 are associated with the target storage block. As shown in FIG. 5, the cache 110 can determine that the nodes 512-3, 512-4, 512-8, 512-9 and 512-10 are associated with the target storage block.

In response to determining, at block 604, that the second cache page is associated with the target storage block, the method 600 proceeds to block 606 where the first list of cache pages to be flushed is added to the set of candidate lists of cache pages. In some embodiments, as shown in FIG. 5, when the cache 110 determines that the nodes 512-3, 512-4, 512-8, 512-9 and 512-10 in the scheduling heap 510 are associated with the target storage block, the cache 110 can add the respective FIFO queues (532-3, 532-4, 532-8, 532-9 and 532-10) corresponding to these nodes to the set of candidate lists of cache pages.

Continuing to refer to FIG. 4, at block 404, the cache 110 determines, from the set of candidate lists of cache pages, at least one cache page associated with the target storage block as the set of target cache pages. In some embodiments, the cache 110 can traverse all cache pages in the cache page lists to determine cache pages associated with the target storage block as the set of target cache pages.

In some embodiments, in order to further prioritize the cache pages which are written earlier, the cache 110 can also determine sequentially relevance of cache pages in a candidate list of cache pages with the target storage block, until finding an unrelated cache page, and add the cache pages therein associated with the storage block to the set of target cache pages. Specifically, in the example as shown in FIG. 5, taking the FIFO queue 532-1 as an example, the cache 110 can search sequentially whether a next cache page in a list is associated with the target storage block, and for example, the cache 110 can determine that the page 534-2 is associated with the target storage block while the page 534-3 is not associated with the target storage block. Based on that the page 534-3 is not associated with the target storage block, the cache 110 can cease determining whether the next page 534-4 is associated with the target storage block, and complete the examination on the FIFO 532-1. In some embodiments, processing of different FIFO queues can be executed concurrently by respective processor cores. In a similar manner, the cache 110 can determine a plurality of cache pages (for example, the plurality of slashed pages in FIG. 5) associated with the target storage block from the set of candidate lists of cache pages into the set of the target cache pages, which can be written in to the target storage device along with page 534-1.

In some embodiments, subsequent to determining the set of the target cache pages, the cache 110 can use new heads of respective FIFO queues 532 as nodes to form a new scheduling heap in an order of timestamps, and select the starting heap node in the scheduling heap as the next new page to be flushed.

In some embodiments, as shown in FIG. 5, the cache 110 can aggregate the first cache page and the set of the target cache pages using a deduplication bitmap 540. Specifically, as shown in FIG. 5, the deduplication bitmap 540 includes therein one or more bits 542-1 to 542-8 (which are referred to as bit 542 collectively or individually), wherein each bit 542 indicates whether a corresponding storage space in the target storage block is required to be modified. For example, each bit 542 can represent 8 KB and thus be consistent with the size of an individual page. As shown in FIG. 5, the bit 524-7 indicates that two cache pages determined from the FIFO queue 532-9 correspond to the same bit, and only one flush operation therefore is required; and the bit 542-5 indicates that it is unnecessary to modify the corresponding storage space in the target storage block. In this way, it can avoid flushing data at the same target address repeatedly according to write requests.

In some embodiments, as shown in FIG. 3, the architecture 300 can further include a hash bucket 330. The hash bucket 330 includes a plurality of buckets 332, an index value of each bucket can be a serial number of a file system, and a range of a target storage space can act as a key value of a hash index, i.e., the same storage space in the same file system is mapped to the same bucket. In some embodiments, the number of buckets in the hash bucket 330 can be set sufficiently large, thereby reducing contentions by different storage spaces for the same bucket. In this case, the hash bucket 330 can also be used to determine the set of the target cache pages.

In some embodiments, the cache 110 can determine, from the hash bucket and based on the target storage block, lists of cache pages to be flushed associated with the target storage block, wherein the hash bucket stores the lists of cache pages to be flushed corresponding to different storage spaces. As shown in FIG. 3, the cache 110 can determine, from the hash bucket 330, a bucket 332 corresponding to the cache pages to be flushed. Thereafter, the cache 110 can determine, from the lists of cache pages to be flushed, at least one cache page associated with the target storage block as the set of the target cache pages. Specifically, the cache 110 can traverse all cache pages in the buckets 332, so as to determine any cache page associated with the target storage block. In the way, the cache 110 can obtain more target cache pages associated with the target storage block at greater overheads.

In some embodiments, the cache 110 can also combine the above two aggregation manners, i.e., the cache 100 can determine first whether a number of pages obtained from aggregation of different FIFO lists reaches a predetermined threshold. If it is determined that the number fails to reach the predetermined threshold, the cache 110 then executes an aggregation procedure by using a hash bucket. In the two-stage aggregation, the cache can obtain cache pages that can be flushed together with less calculation consumption, and avoid too much consumption caused by aggregation. In addition, the cache 110 can ensure enough aggregable cache pages by using the hash bucket-based aggregation manner with more consumption, in a case that not sufficient aggregable cache pages can be obtained through the FIFO list-based aggregation, thereby improving the efficiency of cache flushing.

Continuing to refer to FIG. 2, at block 206, the cache 110 writes the data in the first cache page and the data in each of the set of target cache pages into the target storage block simultaneously. Further in the example of FIG. 1, since the cache page 120-5 and the cache page 120-7 are both associated with the target storage block 140, the cache 110 can write the data in the cache pages 120-1, 120-5 and 120-7 into the target storage block 140 simultaneously, thereby reducing the impact caused by the difference between the minimum unit of the cache 110 and the minimum unit of the storage device 130 and therefore improving the efficiency of the cache. Similarly, in the examples as shown in FIGS. 3 and 5, the cache 110 can write, into the target storage block, the data in the first cache and the data in the at least one cache page from the set of the target cache pages, thereby avoiding multiple writes and locking for a single storage block.

In the above manner, the solution of the present disclosure can solve the problem of size inconsistency between the minimum unit of the cache and the minimum unit of the storage device, and improve the efficiency of cache flushing. In addition, the solution is more suitable for multicore architecture for flushing cache pages, which can reduce conflicts among synchronous FIFO queues and further improve the efficiency of cache page aggregation.

Figure 7:
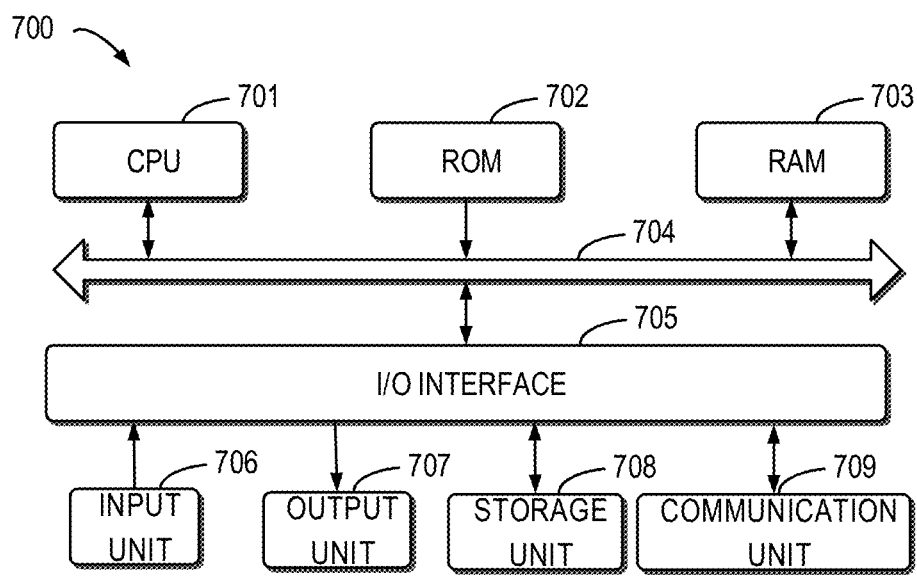
FIG. 7 illustrates a schematic diagram of an example device that can be used to implement the contents of the present disclosure.

FIG. 7 is a schematic block diagram of an example device 700 for implementing embodiments of the present disclosure. For example, the computer device for performing the management function in the storage system 100 as shown in FIG. 1 can be implemented by the device 700. As shown in FIG. 7, the device 700 includes a central processing unit (CPU) 701 which is capable of performing various processes in accordance with computer program instructions stored in a read only memory (ROM) 702 or computer program instructions loaded from a storage unit 708 to a random access memory (RAM) 703. In the RAM 703 are stored various programs and data as required by operation of the device 700. The CPU 701, the ROM 702 and the RAM 703 are connected to one another via a bus 704. An input/output (I/O) interface 705 is also connected to the bus 704.

The following components in the device 700 are connected to the I/O interface 705: an input unit 706 including a keyboard, a mouse, or the like; an output unit 707 such as various types of displays and speakers; the storage unit 708 such as a magnetic disk or optical disk; and a communication unit 709 such as a network card, a modem, a wireless communication transceiver or the like. The communication unit 709 allows the device 700 to exchange information/data with other devices through a computer network such as the Internet and/or various types of telecommunication networks.

The processing unit 701 performs various method and processes described above, for example method 200, method 400 and/or method 600. For example, in some embodiments, the method 200, method 400 and/or method 600 may be implemented as a computer software program or computer program product, which is tangibly contained in a machine-readable medium, for example the storage unit 708. In some embodiments, part or all of the computer program may be loaded and/or installed on the device 700 via ROM 702 and/or communication unit 709. When the computer program is loaded in the RAM 703 and executed by CPU 701, one or more acts of the method 200, method 400 and/or method 600 described above may be executed.

The present disclosure may be a method, an apparatus, a system and/or a computer program product. The computer program product may include a computer readable storage medium (or media) having computer readable program instructions thereon for causing a processor to perform aspects of the present disclosure.

The computer readable storage medium may be a tangible device that may retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. Non-exhaustive and more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other electromagnetic waves propagating freely, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processing unit of the computer or other programmable data processing apparatus, create means (e.g., specialized circuitry) for implementing the functions/actions specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/actions specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or actions, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing a cache, comprising:
   maintaining a plurality of lists of cache pages to be flushed, the lists being associated with a respective plurality of processor cores;
   obtaining, from the plurality of lists of cache pages to be flushed, a first cache page of the cache to be flushed, the first cache page being associated with a target storage block in a storage device;

determining from the plurality of lists of cache pages to be flushed a set of target cache pages to be flushed, each of the set of target cache pages being associated with the target storage block; and writing data in the first cache page and data in each of the set of target cache pages into the target storage block simultaneously, wherein:
the lists of cache pages to be flushed are per-core lists, and determining the set of target cache pages to be flushed from the per-core lists is a first aggregation;
the method further includes maintaining a hash bucket storing lists of cache pages to be flushed as respective buckets associated with respective different storage spaces of the storage device; and
determining the set of target cache pages to be flushed includes first determining whether a number of pages obtained from the first aggregation reaches a predetermined threshold, and when the number of pages fails to reach the predetermined threshold, executing a second aggregation using the hash bucket.

2. The method of claim 1, wherein determining the set of target cache pages comprises:
determining, based on a specific cache page in the plurality of lists of cache pages to be flushed, a set of candidate lists of cache pages from the plurality of lists of cache pages to be flushed; and
determining, from the set of candidate lists of cache pages, at least one cache page associated with the target storage block as the set of target cache pages.

3. The method of claim 2, wherein determining the set of candidate cache page lists comprises:
obtaining a second cache page with the earliest modification time in a first one of the plurality of lists of cache pages to be flushed;
determining whether the second cache page is associated with the target storage block; and
in response to determining that the second cache page is associated with the target storage block, adding the first list of cache pages to be flushed into the set of candidate lists of cache pages.

4. The method of claim 2, wherein a list of cache pages to be flushed is a First Input First Output (FIFO) queue, and wherein the specific cache page is a starting cache page at a head of the FIFO queue, and
wherein determining the set of candidate lists of cache pages comprises determining one or more candidate lists of cache pages from the plurality of lists of cache pages to be flushed, the starting cache page of a candidate list of cache pages being associated with the target storage block.

5. The method of claim 4, wherein determining the at least one cache page from the set of candidate lists of cache pages comprises:
determining relevance of cache pages in at least one candidate list with the target storage block sequentially in an order of the list until finding an unrelated cache page; and
adding cache pages associated with the target storage block into the set of target cache pages.

6. The method of claim 1, further including use of a scheduling heap identifying respective earliest pages in the plurality of lists of cache pages to be flushed in an order of time, and wherein obtaining the first cache page includes obtaining a starting cache page from among the earliest pages according to the scheduling heap, the starting cache page having a cache page address identifying the target storage block.

7. The method of claim 6, wherein the scheduling heap includes a plurality of nodes associated with respective different processor cores and with respective ones of the plurality of lists of cache pages to be flushed, the nodes being arranged according to timestamps of cache pages at heads of respective ones of the lists of cache pages to be flushed.

8. A device for managing a cache, comprising:
at least one processing unit; and
at least one memory coupled to the at least one processing unit and storing instructions for execution by the at least one processing unit, the instructions, when executed by the at least one processing unit, causing the device to perform acts comprising:
maintaining a plurality of lists of cache pages to be flushed, the lists being associated with a respective plurality of processor cores;
obtaining, from the plurality of lists of cache pages to be flushed, a first cache page of the cache to be flushed, the first cache page being associated with a target storage block in a storage device;
determining from the plurality of lists of cache pages to be flushed a set of target cache pages to be flushed, each of the set of target cache pages being associated with the target storage block; and
writing data in the first cache page and data in each of the set of target cache pages into the target storage block simultaneously,
wherein:
the lists of cache pages to be flushed are per-core lists, and determining the set of target cache pages to be flushed from the per-core lists is a first aggregation;
the method further includes maintaining a hash bucket storing lists of cache pages to be flushed as respective buckets associated with respective different storage spaces of the storage device; and
determining the set of target cache pages to be flushed includes first determining whether a number of pages obtained from the first aggregation reaches a predetermined threshold, and when the number of pages fails to reach the predetermined threshold, executing a second aggregation using the hash bucket.

9. The device of claim 8, wherein determining the set of target cache pages comprises:
determining, based on a specific cache page in the plurality of lists of cache pages to be flushed, a set of candidate lists of cache pages from the plurality of lists of cache pages to be flushed; and
determining, from the set of candidate lists of cache pages, at least one cache page associated with the target storage block as the set of target cache pages.

10. The device of claim 9, wherein determining the set of candidate cache page lists comprises:
obtaining a second cache page with the earliest modification time in a first one of the plurality of lists of cache pages to be flushed;
determining whether the second cache page is associated with the target storage block; and
in response to determining that the second cache page is associated with the target storage block, adding the first list of cache pages to be flushed into the set of candidate lists of cache pages.

11. The device of claim 9, wherein a list of cache pages to be flushed is a First Input First Output (FIFO) queue, and wherein the specific cache page is a starting cache page at a head of the FIFO queue, and wherein determining the set of candidate lists of cache pages comprises determining one or more candidate lists of cache pages from the plurality of lists of cache pages to be flushed, the starting cache page of a candidate list of cache pages being associated with the target storage block.

12. The device of claim 11, wherein determining the at least one cache page from the set of candidate lists of cache pages comprises:
   determining relevance of cache pages in at least one candidate list with the target storage block sequentially in an order of the list until finding an unrelated cache page; and
   adding cache pages associated with the target storage block into the set of target cache pages.

13. The device of claim 8, wherein the acts further include using a scheduling heap identifying respective earliest pages in the plurality of lists of cache pages to be flushed in an order of time, and wherein obtaining the first cache page includes obtaining a starting cache page from among the earliest pages according to the scheduling heap, the starting cache page having a cache page address identifying the target storage block.

14. The device of claim 13, wherein the scheduling heap includes a plurality of nodes associated with respective different processor cores and with respective ones of the plurality of lists of cache pages to be flushed, the nodes being arranged according to timestamps of cache pages at heads of respective ones of the lists of cache pages to be flushed.

15. A computer program product being stored in a non-transient computer storage medium and comprising machine-executable instructions which, when executed by a device, cause the device to perform acts comprising:
   maintaining a plurality of lists of cache pages to be flushed, the lists being associated with a respective plurality of processor cores;
   obtaining, from the plurality of lists of cache pages to be flushed, a first cache page of the cache to be flushed, the first cache page being associated with a target storage block in a storage device;
   determining from the plurality of lists of cache pages to be flushed a set of target cache pages to be flushed, each of the set of target cache pages being associated with the target storage block; and
   writing data in the first cache page and data in each of the set of target cache pages into the target storage block simultaneously,
   wherein:
      the lists of cache pages to be flushed are per-core lists, and determining the set of target cache pages to be flushed from the per-core lists is a first aggregation;
      the method further includes maintaining a hash bucket storing lists of cache pages to be flushed as respective buckets associated with respective different storage spaces of the storage device; and
      determining the set of target cache pages to be flushed includes first determining whether a number of pages obtained from the first aggregation reaches a predetermined threshold, and when the number of pages fails to reach the predetermined threshold, executing a second aggregation using the hash bucket.

16. The computer program product of claim 15, wherein determining the set of target cache pages comprises:
   determining, based on a specific cache page in the plurality of lists of cache pages to be flushed, a set of candidate lists of cache pages from the plurality of lists of cache pages to be flushed; and
   determining, from the set of candidate lists of cache pages, at least one cache page associated with the target storage block as the set of target cache pages.

17. The computer program product of claim 16, wherein determining the set of candidate cache page lists comprises:
   obtaining a second cache page with the earliest modification time in a first one of the plurality of lists of cache pages to be flushed;
   determining whether the second cache page is associated with the target storage block; and
   in response to determining that the second cache page is associated with the target storage block, adding the first list of cache pages to be flushed into the set of candidate lists of cache pages.

18. The computer program product of claim 16, wherein a list of cache pages to be flushed is a First Input First Output (FIFO) queue, and wherein the specific cache page is a starting cache page at a head of the FIFO queue, and
   wherein determining the set of candidate lists of cache pages comprises determining one or more candidate lists of cache pages from the plurality of lists of cache pages to be flushed, the starting cache page of a candidate list of cache pages being associated with the target storage block.

19. The computer program product of claim 18, wherein determining the at least one cache page from the set of lists of candidate cache pages comprises:
   determining relevance of cache pages in at least one candidate list with the target storage block sequentially in an order of the list until finding an unrelated cache page; and
   adding cache pages associated with the target storage block into the set of target cache pages.

20. The computer program product of claim 15, wherein the acts further include using a scheduling heap identifying respective earliest pages in the plurality of lists of cache pages to be flushed in an order of time, and wherein obtaining the first cache page includes obtaining a starting cache page from among the earliest pages according to the scheduling heap, the starting cache page having a cache page address identifying the target storage block.

21. The computer program product of claim 20, wherein the scheduling heap includes a plurality of nodes associated with respective different processor cores and with respective ones of the plurality of lists of cache pages to be flushed, the nodes being arranged according to timestamps of cache pages at heads of respective ones of the lists of cache pages to be flushed.

* * * * *